United States Patent
Gudenus et al.

(10) Patent No.: US 8,732,850 B2
(45) Date of Patent: May 20, 2014

(54) METHOD FOR PROTECTING DATA CONTENTS

(75) Inventors: Gabriel Gudenus, Vienna (AT); Peter Weiss, Vienna (AT)

(73) Assignee: Siemens Convergence Creators GmbH, Vienna (AT)

( * ) Notice: Subject to any disclaimer, the term of this patent is extended or adjusted under 35 U.S.C. 154(b) by 0 days.

(21) Appl. No.: 13/539,668

(22) Filed: Jul. 2, 2012

(65) Prior Publication Data

US 2013/0014276 A1    Jan. 10, 2013

(30) Foreign Application Priority Data

Jul. 4, 2011  (EP) .................................. 11172574

(51) Int. Cl.
  *G06F 7/04*  (2006.01)
  *G06F 21/10*  (2013.01)
(52) U.S. Cl.
  CPC ..................... *G06F 21/10* (2013.01)
  USPC .......................................................... 726/27
(58) Field of Classification Search
  CPC .................................................... G06F 21/10
  USPC ............................................................ 726/27
  See application file for complete search history.

(56) References Cited

U.S. PATENT DOCUMENTS

| | | |
|---|---|---|
| 7,594,142 B1 | 9/2009 | Fly |
| 2002/0164023 A1 | 11/2002 | Koelle |
| 2004/0136533 A1* | 7/2004 | Takagaki et al. ............... 380/255 |
| 2006/0067443 A1* | 3/2006 | Liu et al. ........................ 375/347 |
| 2007/0083937 A1 | 4/2007 | Koelle |
| 2008/0140714 A1 | 6/2008 | Davis |
| 2011/0305435 A1* | 12/2011 | Tanaka et al. .................. 386/259 |
| 2012/0042391 A1* | 2/2012 | Risan ............................... 726/28 |
| 2012/0155233 A1* | 6/2012 | Spitzlinger et al. ......... 369/30.09 |

* cited by examiner

*Primary Examiner* — Techane Gergiso

(57) ABSTRACT

A method for protecting data contents, in particular video data, is provided. The data contents are provided by a distribution application available in a communications network and may be loaded onto an output unit to be played back on this output unit. A current system utilization of the output unit is monitored or measured during playback of the loaded data contents on the output unit. This current system utilization is compared to an estimated standard system utilization of the output unit for the playback of data contents. If the current system utilization of the output unit exceeds the estimated standard system utilization during a predefined period, appropriate protective measures, such as interrupting playback of the data contents, a corresponding message to the distribution application, etc., are taken and carried out to protect the data contents.

19 Claims, 1 Drawing Sheet

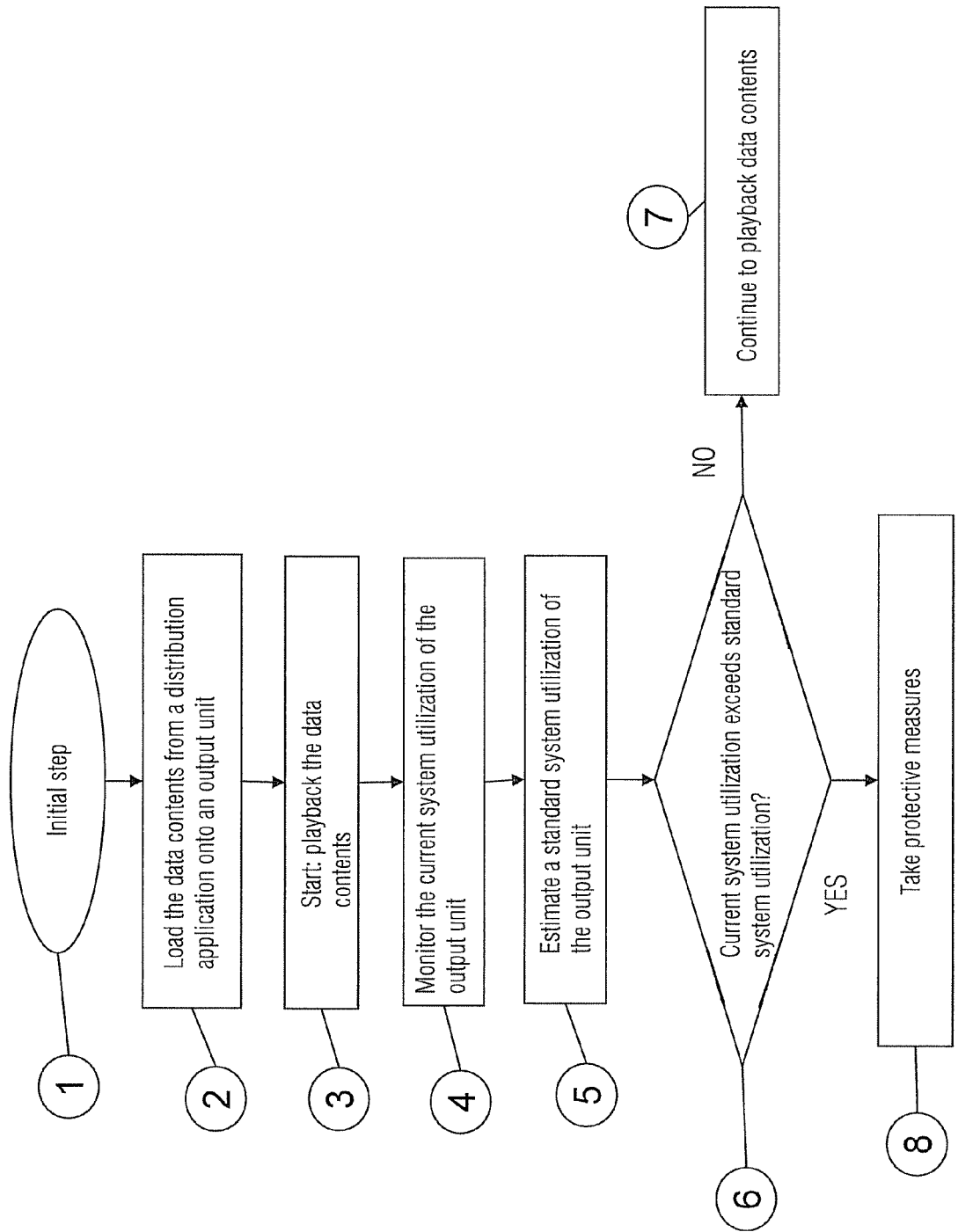

METHOD FOR PROTECTING DATA CONTENTS

CROSS REFERENCE TO RELATED APPLICATIONS

This application claims priority of European Patent Office Application No. 11172574.3 EP filed Jul. 4, 2011. All of the applications are incorporated by reference herein in their entirety.

FIELD OF INVENTION

A method for protecting data contents, in particular video data, is provided. The data contents are provided by a distribution application (for example YouTube, Maxdome, Apple iTunes, etc.) available in a communications network and may be loaded from there onto an output unit. The data contents are then played back on the output unit (for example personal computer, laptop, tablet PC, etc.).

BACKGROUND OF INVENTION

Current distribution applications for data contents, such as YouTube, Maxdome, Apple iTunes, etc., conventionally available in a communications network, such as the Internet, allow by way of example these data contents, which are usually video data, to be loaded or transferred onto output units (for example personal computers, laptops, mobile devices, tablet PCs, etc.). Primarily fee-based, high-quality data contents are conventionally protected against unauthorized access and/or against unauthorized copying by what is known as Digital Right Management or DRM systems.

Digital Right Management (DRM) includes methods and/or systems which control the use and optionally also the distribution of digital data contents. Digital Right Management (DRM) or usage security is used primarily for what is known as audio and/or video content, but also in the case of software, electronic documents and/or electronic books. Digital Right Management allows data contents providers to implement usage control for their data contents, to develop new charging options (for example payment of licenses, authorizations, etc.) and to thereby have the rights of use to data contents paid for instead of the data contents themselves.

A DRM system or a system for digital right management represents a technical security measure to provide a legal owner or provider of data contents, known as information assets, with the option of technically limiting the manner in which his property (i.e. the data contents) is used to a previously made usage agreement. Electronic protective measures for the data contents are used for this purpose which enable utilization of the data contents beyond a purely flat fee and also allow, by way of example, individual licensing/charging according to frequency of use, length of use and/or extent of use, and prohibit unauthorized use (for example copying, reproductions, etc.). Unlimited use can be restricted, and what are referred to as on-demand business models are enabled which are impossible or very difficult to achieve without DRM systems.

DRM systems encrypt data contents, such as audio and/or video contents, etc., against digital transfer onto an output unit, i.e. the data stream (for example what is known as a video stream, etc.) is encrypted by the DRM system. The encrypted data stream is transferred to an output unit, such as a PC, laptop, etc., and then decrypted directly on the output unit—by way of example with appropriate authorization, once the authorizations have been checked by the DRM system, etc. Capture of data contents during a transfer between distribution application and output unit, for example via a communications network, such as the Internet, or before display on the output unit is thus prevented. For continued display or for examination of the data contents, in particular video data, for example on a screen, which may be part of the output unit, the data contents must exist in a completely unencrypted form. In other words, the data contents must be made available to, for example, a graphics card of the output unit (for example PC, laptop, etc.) or to an application to display the respective data contents in completely unencrypted form.

However, there is a risk—in particular in the case of exclusive high-quality data contents (for example video content before availability on what are referred to as DVDs, etc.)—of these data contents being digitally filmed or copied by what is known as screen capture software, for example during playback on the output unit, in order to then be able to continue to use the data contents unprotected or contrary to a usage agreement or for example re-use them (for example in data file sharing services, etc.).

Because of high resource or system requirements during capturing data contents, recording and/or filming data contents in high quality, in particular of video data, was still not possible by older screen capture software (for example Camtasia, Tunebite, WM Capture, etc.). Displaying these data contents for example on an output unit, such as a screen, is therefore uncompressed. This means that, for example, 124.4 megapixels per second (Mpx/s) accumulate in the case of video data in what is known as High Definition or HD quality (i.e. 1080p@60 Hz or 1920×1080 pixels in interlaced scanning and 60 fields per second).

In the case of what is known as screen capturing, this enormous data rate has to be processed for example by the output unit, primarily by the processor of the output unit, on which the data content is played back or filmed. Then for a corresponding copy of the data content, the data content is buffered by way of example in what is known as a RAM of the output unit and ultimately written to a medium (for example hard disk of the output unit, etc.). What is known as encoding may also be carried out optionally. Utilization of the output unit, in particular of the processor and the RAM, is increased further as a result and only the utilization of the storage medium (for example hard disk, etc.) is reduced. Due to the high loading of the output unit, filming of data contents, in particular filming of data contents in HD quality, during playback on the output unit was therefore difficult or impossible using older screen capture software.

There is a possibility, primarily in order to reduce the utilization of the output unit (for example processor, RAM), of capturing or copying the data contents with a lower image resolution and/or with a lower image frequency when filming data contents using screen capture software. The quality of the filmed/copied data contents is thereby reduced. The filmed or copied data contents are therefore of a quality similar by way of example to a film or camera recording in a cinema.

The hardware capacities of output units (for example PC, laptop, etc.) are constantly being improved and increased. Therefore, secured data contents are being avoided successfully during screen capturing or filming/copying of data contents, in particular video data, which run on an output unit. Due to the improved and increased hardware capacities of the output units, it is technically easier to digitally film or copy protected data contents, in particular video data, primarily by screen capture software and to then re-use this in an unprotected manner or by avoiding rights of use or digital legal safeguards, or to distribute for example via file sharing services. This means that data contents, such as high-quality video data, etc., are no longer sufficiently secured and protected by pure encryption or by the use of DRM systems. Suitable protection against illegal filming, photographing and/or copying, in particular against screen capturing, should therefore be implemented.

Attempts are already being made in this regard such as in an application belonging to WIDEVINE®, which belongs to the company GOOGLE®. What is known as Digital Copy Protection, in particular in combination with a DRM system, is offered by the company WIDEVINE®. This Digital Copy Protection is described by way of example in document US 2007/0083937 A1. The mode of operation in the method disclosed in this document for protecting digital data or media contents is similar to what is known as a virus scanner. What are known as detectors are sent along with the protected data and they monitor all processes on the user's output unit for suspicious processes, such as screen capturing software, etc., during use of protected media contents or data. Suspicious processes are detected by the detectors and the detectors send corresponding messages, by way of example via the Internet, to a central monitoring system to implement for example corresponding, predefined measures and optionally prevent illegal copying. Measures of this kind range for example from silent observation of the suspicious processes to immediate revocation of the rights of use to the data contents.

However, the method described in US 2007/0083937 A1 has the drawback that behavior of the output unit must be constantly analyzed and reported back via the Internet to a monitoring system, wherein the detectors also have to be adjusted. New behavior patterns of the output unit are then transmitted in the form of new or adapted detectors again via the Internet for example to the output unit. This means that during playback of data contents ongoing monitoring and an exchange of monitoring data is carried out (for example messages from the detectors, adjustment of the detectors, etc.) between the output unit and the central monitoring system—sometimes without the user's knowledge. This is not completely unobjectionable for data protection reasons for example because the screen capture software could for example also be installed on the output unit for lawful purposes (i.e. for permitted copying of data contents, etc.). It is also necessary in the case of the method illustrated in US 2007/0083937 A1 for the distribution system, which provides the data contents, to have a corresponding monitoring system or to have a connection thereto. Ongoing adjustment of the monitoring solution may also be necessary to always detect the most current or changed suspicious patterns of behavior of the output units.

SUMMARY OF INVENTION

A method by way of which illegal copying of data contents, in particular video data, in particular without use of data protection-relevant information, is prevented on an output unit easily and without great expenditure or ongoing adjustments, is provided.

The method includes that a current system utilization of the output unit is monitored during playback of data contents loaded onto an output unit via a communications network. The current system utilization of the output unit is then compared with an estimated standard system utilization of the output unit. If the current system utilization significantly and clearly exceeds the estimated standard system utilization appropriate protective measures are taken for the data contents.

The main aspect of the solution lies primarily in that illegal copying of protected data contents for example by copying software, in particular screen capturing software, is thereby easily prevented on the output unit. Such illegal copying of data contents may also be used for future output units or their hardware without great expenditure. The method does not require any ongoing communication via a communications network with a monitoring system and/or regular updates of monitoring software or corresponding protective applications to detect corresponding copying software on the output unit. It is also not necessary to install corresponding protective applications and/or monitoring systems in the case of the distribution applications. The method may be simply and easily adapted to the respective output unit for protection of data loaded from distribution applications.

Potential misuse of data contents, in particular during playback, retrieval, etc.

of data contents such as video contents, etc., is easily detected as a result. If such misuse is detected, appropriate protective measures may be taken for the data contents. Data protection-relevant information, such as ongoing processes, installed software, etc., are not used either for this purpose and/or an external application transmitted, optionally without the output unit user's knowledge. Due to an "absolute" calculation of system utilizations there is no "window" between an improvement in screen capturing software and an update of the corresponding protective software, which is required for detection of copying on the output unit, and a never-ending cycle of misuse or corresponding applications (for example screen capturing software, etc.) and appropriate protective software is thus prevented.

In an embodiment, the system utilization for decoding and decryption of the data contents to be played back and the system utilization for basic applications running by default on the output unit are used for estimating the standard system utilization of the output unit. The method may therewith be used very easily for any encrypted and coded (for example by DRM systems) data contents since the corresponding system utilization is always taken into account for the respectively required decoding and decryption of the data contents. Basic applications running by default on the output unit, such as operating system applications, background applications, etc., are also taken into account. This prevents basic applications of this kind from leading to misinterpretation of the current system utilization. In addition it is possible, by appropriate consideration when estimating the standard system utilization, to take into account permissible copying or an installation of copying software (for example screen capturing software) for legal purposes or where corresponding authorizations exist.

In another embodiment, monitoring of the current system utilization of the output unit is carried out during a predefined period and is compared with the estimated standard system utilization of the output unit for this period. A period within which monitoring or checking for inadmissible copying of the data contents is carried out during playback of data contents, may be easily limited thereby. If no significant difference is found between the system utilization and the estimated standard system utilization within this period, the data contents are most probably not copied since, in particular in the case of video contents, the data contents are conventionally copied during the entire playback. If a large difference is found between current system utilization and estimated, expected standard system utilization during the predefined period then copying by copying software or screen capturing is probable and appropriate measures may quickly be taken to protect the data contents.

Another embodiment provides that, when the current system utilization exceeds the standard system utilization, playback of the data contents is interrupted as a protective measure. Copying of protected data is thereby easily prevented. Stopping or interrupting playback of the data contents on the output unit are for example stopping or interrupting a transfer of the data contents from the associated distribution application (for example Maxdome, Apple iTunes, etc.) to the output unit and/or in particular in the case of video data, but also audio data which are being streamed (i.e. playback of the data contents on the output unit begins as early as during or almost simultaneously with transfer of the data contents), or stopping of the streaming.

In a further embodiment it is possible, when the current system utilization exceeds the standard system utilization, to send a message to the respective distribution application, from which the data contents have been transferred or are streamed, as a protective measure for the data contents. This protective measure for the data contents may inform for example the provider of data contents about illegal copying of the data contents. The message may, however, also be sent by way of example to what is known as a backend system for analysis purposes, or to the legal owner of the data contents. Sending the message may occur by way of example as an alternative or in addition to interruption of playback of the data contents on the output unit.

In another embodiment, a limit value or optionally also a plurality of limit values are predefined for a difference between current system utilization and estimated standard system utilization of the output unit. A limit value means for example that it can be established very easily whether the current system utilization has already significantly and conspicuously exceeded the estimated standard system utilization or lies within a tolerable fluctuation margin. Various protective measures for the data contents may also be determined in each case by predefining one or optionally a plurality of limit values for the difference. A message for example may therefore be sent to the distribution application if the current system utilization of the output unit exceeds the estimated standard system utilization but the difference is below a predefined limit value. Only, for example, if the predefined limit value is exceeded by the difference between current system utilization and estimated standard system utilization of the output unit, a playback of the data contents on the output unit may be interrupted.

BRIEF DESCRIPTION OF THE DRAWINGS

The method will be described by way of example below with reference to the accompanying FIGURE which schematically and by way of example illustrates a sequence of the method for protecting data contents.

DETAILED DESCRIPTION OF INVENTION

The FIGURE shows by way of example and in a schematic manner a sequence of the method for protecting data contents which are loaded onto an output unit from a distribution application, such as YouTube®, Maxdome®, Apple iTunes®, etc., via a communications network such as the Internet. A personal computer, laptop, tablet PC, etc. by way of example may be used as the output unit.

The method begins with an initial step 1. In the process, data contents, in particular video data, are loaded in a second method step 2 from the distribution application, by way of example as what is known as a video stream, onto the output unit. Display or playback of the data contents on the output unit or the associated screen is then begun in a third method step 3 on the output unit. The data contents may also be decoded and/or decrypted accordingly in a third method step 3 so they may be displayed on the output unit for a user.

In a fourth method step 4, a current system utilization of the output unit (for example utilization of processor, RAM, etc.) is analyzed and monitored during display or playback of the data contents. A standard system utilization of the output unit is estimated in a fifth method step 5 simultaneously therewith. A system utilization that is to be expected for display or playback of data contents is estimated. In other words, a system utilization of the output unit for basic applications which run by default, such as operating system applications, background applications, etc., is used since these basic applications conventionally run on the output unit and a corresponding system utilization is provided when the output unit is operating. In addition, a system utilization for decoding and decryption of the data contents to be played back is also taken into account when estimating the standard system utilization of the output unit, so that the system utilization, which is caused by decoding and decryption of the data contents, does not lead to incorrect triggering of protective measures.

Once the standard system utilization of the output unit has been estimated, the estimated standard system utilization to be expected for playback of data contents is compared with the current system utilization of the output unit in a sixth method step 6. Monitoring of the current system utilization or estimation of the standard system utilization may be carried out for a predefined or predefinable period.

If it is determined, in the sixth method step 6, that the current system utilization of the output unit does not exceed the estimated standard system utilization of the output unit expected for playback of data contents, in particular video data or video streams, or optionally only slightly exceeds it, then output or playback of the data contents is continued in a seventh method step 7. If, however, in the sixth method step 6, the current system utilization is found to exceed, and in particular significantly exceed the estimated standard system utilization, appropriate measures are taken in an eighth method step 8 to protect the data contents—primarily against illegal copying by the use of copying software, in particular what is known as screen capturing.

A message may be sent by way of example in the eighth method step 8 to the distribution application, from which the data contents are obtained via the communications network, as a corresponding protective measure. In addition or alternatively it is also possible, in the eighth method step 8, to stop display or playback of the data contents on the output unit or for example to end video streaming, so the user may not generate an exploitable copy of the data contents on the output unit.

For an improved estimation of whether additional copying of the data contents on the output unit is possibly being carried out or not, it is conceivable in the sixth method step 6 to not only check whether the current system utilization of the output unit exceeds the estimated standard system utilization, but to also determine a difference between current system utilization and estimated standard system utilization. A limit value may be predefined for this difference. If it is found in the sixth method step 6 that the difference exceeds the limit value, appropriate protective measures (for example message to the distribution application, stopping of playback, etc.) may then be introduced for the data contents in the eighth method step 8.

Illegal copying of, in particular, protected data contents on an output unit may thus be prevented very easily, even in the case of correspondingly powerful hardware or for future hardware. No installation or ongoing adjustment of protective applications is required either and no data protection-relevant information (for example ingoing processes, installed software on the output unit, etc.) are requested or used by the method either.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A method for protecting data contents, wherein the data contents are loaded from a distribution application available in a communications network onto an output unit and are played back on the output unit, comprising:
    monitoring a current system utilization of the output unit during playback of loaded data contents on the output unit,
    comparing the current system utilization to an estimated standard system utilization of the output unit for playback of data contents, wherein the comparing is configured to detect a presence of copying software that captures the data contents being played back on the output unit, and
    taking appropriate protective measures to avoid the capture of the data contents when the current system utilization exceeds the estimated standard system utilization.

2. The method as claimed in claim 1, wherein a system utilization for decoding and decryption of data contents to be played back on the output unit and a system utilization for basic applications which run by default on the output unit are used for estimating the standard system utilization of the output unit.

3. The method as claimed in claim 2, wherein the monitoring of the current system utilization of the output unit is carried out during a predefined period and is compared with the estimated standard system utilization of the output unit for this period.

4. The method as claimed in claim 2, wherein playback of the data contents is interrupted as a protective measure for the data contents when the current system utilization exceeds the standard system utilization.

5. The method as claimed in claim 1, wherein the monitoring of the current system utilization of the output unit is carried out during a predefined period and is compared with the estimated standard system utilization of the output unit for this period.

6. The method as claimed in claim 1, wherein playback of the data contents is interrupted as a protective measure for the data contents when the current system utilization exceeds the standard system utilization.

7. The method as claimed in claim 1, further comprising:
    sending a message to the distribution application as a protective measure for the data contents when the current system utilization exceeds the standard system utilization.

8. The method as claimed in claim 7, further comprising:
    defining a limit for a difference between a current system utilization and an estimated standard system utilization.

9. The method as claimed in claim 1, further comprising:
    defining a limit for a difference between a current system utilization and an estimated standard system utilization.

10. The method of claim 1, wherein the copying software comprises screen capturing software.

11. The method of claim 10, wherein the detecting indicative of the presence of the copying software occurs when the present system utilization exceeds the estimated standard system utilization.

12. The method of claim 10, wherein the copying software comprises screen capturing software.

13. A non-transitory computer readable storage medium storing program code which executes, when run on a computer, a method of protecting data contents, wherein the data contents are loaded from a distribution application available in a communications network onto an output unit and are played back on the output unit, the method comprising:
    monitoring a current system utilization of the output unit during playback of loaded data contents on the output unit,
    comparing the current system utilization to an estimated standard system utilization of the output unit for playback of data contents, wherein the comparing is configured to detect a presence of copying software that captures the data contents being played back on the output unit, and
    interrupting the playback to avoid the capture of the of the data contents when the current system utilization of the output unit exceeds the estimated standard system utilization.

14. The non-transitory computer readable storage medium as claimed in claim 13, wherein a system utilization for decoding and decryption of data contents to be played back on the output unit and a system utilization for basic applications which run by default on the output unit are used for estimating the standard system utilization of the output unit.

15. The non-transitory computer readable storage medium as claimed in claim 13, wherein the monitoring of the current system utilization of the output unit is carried out during a predefined period and is compared with the estimated standard system utilization of the output unit for this period.

16. The non-transitory computer readable storage medium as claimed in claim 13, the method further comprising:
    sending a message to the distribution application when the current system utilization of the output unit exceeds the estimated standard system utilization.

17. The non-transitory computer readable storage medium as claimed in claim 13, the method further comprising:
    defining a limit for a difference between the current system utilization and the estimated standard system utilization.

18. The non-transitory computer readable storage medium of claim 13, wherein the copying software comprises screen capturing software.

19. A method for protecting data contents, wherein the data contents are loaded from a distribution application available in a communications network onto an output unit and are played back on the output unit, comprising:
    monitoring a present system utilization of the output unit during playback of loaded data contents on the output unit,
    comparing the present system utilization to an estimated standard system utilization of the output unit for playback of data contents,
    based on a result of the comparing, detecting a presence of copying software that captures the data contents being played back on the output unit, and
    when the detecting indicates the presence of the copying software, taking appropriate protective measures for preventing the capture of the data contents by the copying software.

* * * * *